United States Patent [19]

Muller et al.

[11] Patent Number: 4,501,282
[45] Date of Patent: Feb. 26, 1985

[54] COMBINE HARVESTER CROP IN-FEED CONVEYOR

[75] Inventors: Jean Claude Muller, Verrieres le Buisson; James B. McNaught, Wasquehal, both of France

[73] Assignee: Massey-Ferguson Services N.V., Curacao, Netherlands Antilles

[21] Appl. No.: 403,743

[22] PCT Filed: Nov. 25, 1981

[86] PCT No.: PCT/GB81/00258
  § 371 Date: Aug. 2, 1982
  § 102(e) Date: Aug. 2, 1982

[87] PCT Pub. No.: WO82/01805
  PCT Pub. Date: Jun. 10, 1982

[30] Foreign Application Priority Data
  Dec. 6, 1980 [GB] United Kingdom ............... 8039224

[51] Int. Cl.³ ............................................. A01F 12/10
[52] U.S. Cl. .................................. 130/27 P; 56/14.6; 130/27 AB
[58] Field of Search ............... 130/27 P, 27 Q, 27 S, 130/27 J, 27 K, 27 L, 27 R, 27 AB; 56/11.1, 14.6, 10.2; 122, DIG. 15

[56] References Cited

U.S. PATENT DOCUMENTS

| 1,404,472 | 1/1922 | North ................................ 56/11.1 |
| 2,212,297 | 8/1940 | Liverman ........................... 130/1 |
| 2,230,018 | 1/1941 | Stromstad ......................... 130/1 |
| 2,305,964 | 12/1942 | Harrison et al. ................. 130/27 J |
| 2,358,548 | 9/1944 | Welty ................................ 130/1 |
| 2,639,569 | 5/1953 | Pastarczak ...................... 56/11.1 |
| 2,749,696 | 6/1956 | Innes ................................. 130/1 |
| 3,073,099 | 1/1963 | Andersen ......................... 56/11.1 |
| 3,527,233 | 9/1970 | Mathews ........................... 56/14.6 |
| 3,606,742 | 9/1971 | Wieneke et al. ................. 130/27 J |
| 3,659,618 | 5/1972 | Kobald ............................. 130/27 R |
| 3,662,763 | 5/1972 | Denison et al. ................. 130/27 P |
| 3,759,021 | 9/1973 | Schreiner et al. ............... 56/11.1 |
| 3,943,939 | 3/1976 | Rowland-Hill ................... 56/14.6 |

FOREIGN PATENT DOCUMENTS

| 2318293 | 11/1974 | Fed. Rep. of Germany ....... 56/14.6 |
| 2368888 | 7/1977 | Fed. Rep. of Germany . |
| 627776 | 8/1978 | U.S.S.R. ......................... 130/27 AB |
| 798364 | 1/1981 | U.S.S.R. ......................... 130/27 P |

Primary Examiner—Robert P. Swiatek
Assistant Examiner—John G. Weiss
Attorney, Agent, or Firm—Robert L. Farris

[57] ABSTRACT

A combine harvester of the type having a crop elevator 9, 10, 11 that feeds crop upwards across a crop floor 11 to a crop threshing mechanism comprising a threshing cylinder 1 located adjacent a concave threshing grate 13 and driven to thresh crop fed tangentially between the cylinder and grating, a crop conveyor 14 in the form of a roller or continuous band conveyor being located along the leading edge of the grate 13 with respect to the crop feed direction so that crop passes over it to the cylinder and grating and a changeable speed drive mechanism being provided to drive the conveyor 14 and allow its speed to be changed, thereby to control the speed of crop flow. The crop elevator 9, 10, 11 is supported to pivot about the axis of the cylinder 1 to raise and lower a crop collecting table 2 carried at the bottom of the elevator, the conveyor 14 being located between the upper end of the elevator floor 11 and the leading edge of the grate 13 so as to form a substantially continuous crop flow path with said floor and grate. The grate 13 and conveyor 14 are mounted so as to pivot with the elevator 11 about the axis of the cylinder 1. A crop guide flap 15 is provided adjacent the conveyor 14 to vary the angle at which the crop is fed to the cylinder 1.

10 Claims, 4 Drawing Figures

COMBINE HARVESTER CROP IN-FEED CONVEYOR

TECHNICAL FIELD

This invention relates to crop threshing mechanisms of the type that includes a rotating threshing cylinder that is located adjacent a concave so as to thresh crop fed tangentially between the cylinder and concave.

The rate of threshing of the aforesaid mechanism is determined by the dimensions of the cylinder and concave and the distance between them and the speed of rotation of the cylinder. Increasing the speed of rotation increases the threshing rate but also increases the aggressiveness of the threshing action which in turn can damage the grain.

DISCLOSURE OF THE INVENTION

An object of the present invention is to improve the performance of a grain threshing mechanism of the aforesaid type, especially as far as threshing rate and grain damage are concerned.

This object is achieved according to the present invention by providing a driven crop conveyor, such as a roller or continuous band-type conveyor, along the front edge of the concave so that crop passes over it into the space between the cylinder and concave and the speed of crop flow is thereby controlled, the speed of the conveyor being changeable.

The conveyor may operate at a speed so as to speed up the flow of crop supplied by primary feed means such as a combine harvester crop elevator. The relative speed of the crop and cylinder may therefore be reduced, thereby reducing the aggressiveness of the cylinder threshing action and reducing grain damage. Alternatively, the increased crop flow speed can be matched by an increase in the speed of rotation of the cylinder so as to give an increased threshing rate whilst avoiding an increase in grain damage.

The extent to which the conveyor speeds up the flow of crop will vary with different crops and conditions and the threshing results required. Possibly, the peripheral speed of the conveyor may approach that of the cylinder. In other cases, the conveyor may even serve to slow down the flow of crop supplied by a primary feed means.

DESCRIPTION OF THE DRAWINGS

The invention will now be described by way of example with reference to the accompanying drawings in which.

BEST MODE OF CARRYING OUT THE INVENTION

Figure 1:
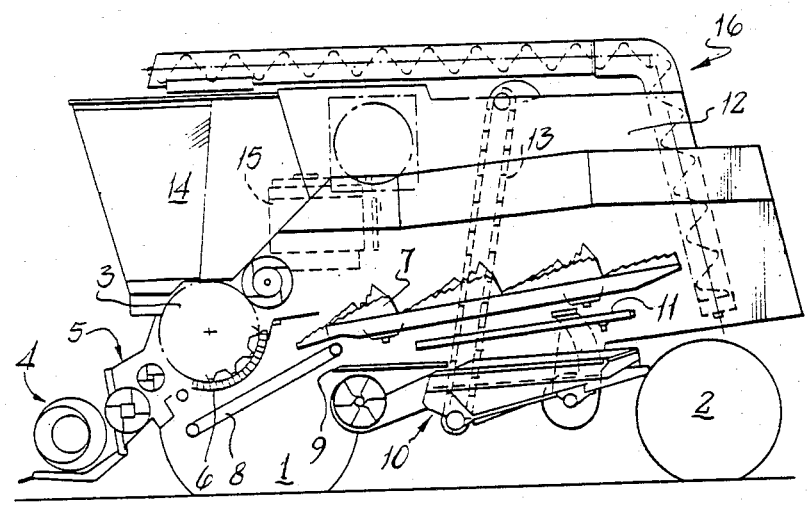
FIG. 1 is a general side view of one embodiment of a combine harvester having a crop threshing mechanism according to the invention.

The illustrated combine harvester has a chassis with two front drive wheels 1 and two rear steering wheels 2. A threshing cylinder 3 is mounted transversely between the front wheels 1 and a crop gathering table 4 is mounted on the front of the combine and feeds cut crop to the cylinder via a crop elevator 5. The crop is threshed between the cylinder 3 and an open grate concave 6 and the straw is fed onto straw walkers 7 that pass it rearwards. A grain elevator 8 in the form of an endless conveyor collects grain that falls through the concave 6 and passes this via a grain pan 9 to a shaker shoe 10. The shaker shoe also receives grain from the straw walkers via a grain pan 11. Clean grain is fed from the shaker shoe to a grain tank 12 by an elevator 13. The tank 12 is located behind the driver's cab 14 and combine engine 15, and is in the form of a saddle that straddles the straw walkers. Grain is unloaded from the tank through a discharge pipe 16.

The table 4 is mounted on the front of the combine so that it is pivotable about the axis 17 of the threshing cylinder 3. U.S. Pat. No. 3,662,763 shows how the table of a combine might be pivotally mounted about the axis of the threshing cylinder and also shows the concave mounted to pivot with the table. The table carries a cutterbar 18 along its front edge and a cross auger 19 behind the cutterbar that feeds cut crop inwards from both sides of the table to a central feed rotor 20 that is integral with the auger. The rotor 20 has feed fingers 21 projecting from it that are rotatable about an axis 22 offset from that of the rotor so that they move radially in a predetermined manner relative to the rotor as they rotate with the rotor. Cut crop is fed rearwards by the rotor 20 to the elevator 5 comprising two paddle rotors 23, 24 located above an elevator floor 25 incorporating a stone trap 26. These paddle rotors feed the crop rearwards and upwards to the cylinder for threshing.

The cylinder 3 co-operates with the open grate concave 6 beneath it to effect a threshing action. Furthermore, a roller 27 is mounted along the front edge of the concave beneath the cylinder so that its upper surface forms a continuation of the elevator floor 25 leading to the concave 6 and runs into a nip with the cylinder 3. The roller 27 is driven and controls the speed of crop flow into the space between the cylinder and concave. An increase in crop speed can be used to give reduced grain cracking for a set cylinder speed or to enable the speed of the cylinder to be increased without increasing grain cracking.

The roller 27 is driven in step with the cylinder 3. The drive mechanism is adapted to allow the speed of the roller to be changed relative to that of the cylinder, and comrises a V-belt drive 28 between two variable ratio pulleys 29, 30 on the shafts of the cylinder and roller 31, 32, respectively. A control mechanism 33 is provided to allow the ratio to be changed either in a continuous or discrete manner.

In operation the roller 27 may also co-operate with the adjacent parts of the cylinder and concave to produce an additional threshing action.

The surface of the roller 27 may be grooved or fluted longitudinally or provided with longitudinal gripper bars so as to assist its feed and threshing actions.

Figure 3:
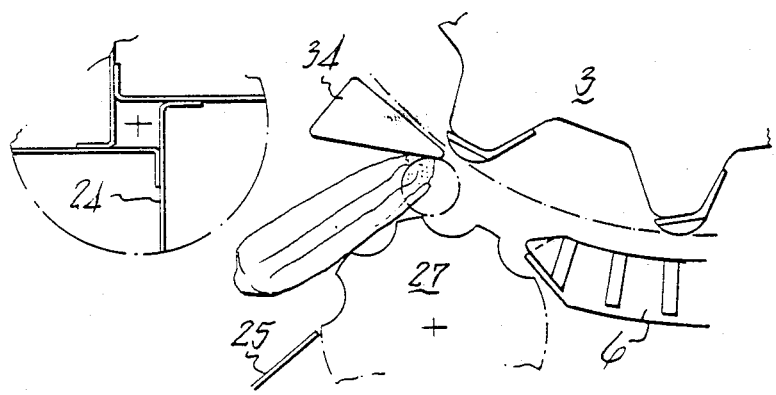
FIG. 3 is a scrap view of the threshing mechanism of FIG. 2.

In operation, the roller 27 also serves to orientate maize cobs so that they lie transversely as they are fed between the cylinder and concave, thereby avoiding jamming. This is illustrated in FIG. 3 of the drawings where a longitudinally orientated cob is shown in full line and the same cob is shown in broken line after being rolled into a transverse orientation by the roller.

A crop guide flap 34 is provided adjacent the roller 27 between the second paddle rotor 24 and the cylinder 3 and is adjustable towards and away from the roller.

Figure 2:
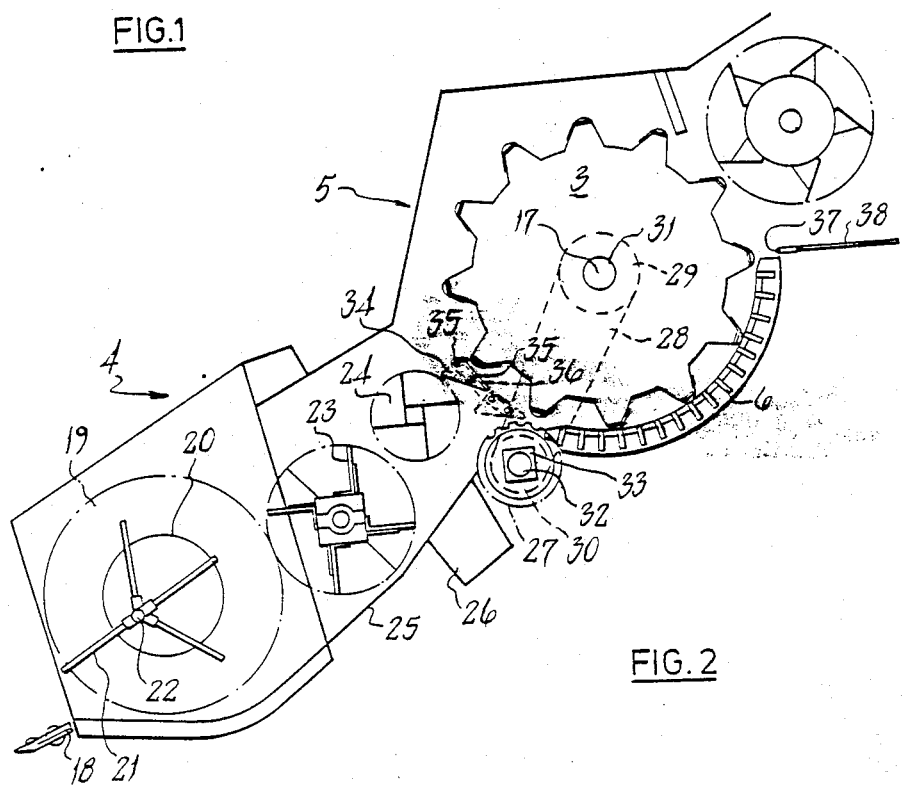
FIG. 2 is an enlarged side view of the crop threshing mechanism of FIG. 1.

For example, as indicated in FIG. 2, the flap 34 may be supported at each end by bolts 35 that engage in slots 36 so as to guide movement of the flap relative to the roller. This flap enables the feed angle of the crop relative to the cylinder to be varied so that the shock effect of the cylinder on the crop is varied. Thus, for example, when threshing crop that is prone to grain cracking, the flap 34 can be moved towards the roller 27 so that it lies more in the path of the crop and deflects it downwards more tangentially into the space between the cylinder and roller. In an alternative arrangement the flap 34 may be adjustable angularly about a transverse axis. The flap 34 is also helpful in aligning maize cobs as shown in FIG. 3.

The concave 6, roller 27 and flap 34 are all mounted so as to move with the table about the axis 17 of the cylinder, thereby ensuring that the relative orientation of these components and the conveyor 23, 24, 25 remain constant with up and down movement of the table. The manner in which this can be achieved is illustrated by way of example in U.S. Pat. No. 3,662,763 which shows a concave carried on a feeder housing 10 as to pivot with the feeder housing about the axis of the cylinder. It would be a simple matter to mount the roller 27 and flap 34 together with the concave 6 on a similar feeder housing so as to pivot about the cylinder axis 17. The rear end of the concave 6 therefore moves, and a fixed resilient guide 37 is provided to co-operate with this rear end of the concave to guide the threshed crop onto a sieve 38 leading to the straw walkers 8.

The roller 27 may be composed of metal, for example, it may be a steel cylinder. Alternatively, it may be composed of a resilient material that would give a less aggressive threshing action, thereby further reducing grain cracking. A resilient roller would also flex to avoid the jamming of crops, especially maize cobs.

In a typical embodiment of the invention employing a large diameter threshing cylinder (800 millimeters diameter), a suitable roller 27 may have a diameter of about 200 millimeters.

Figure 4:
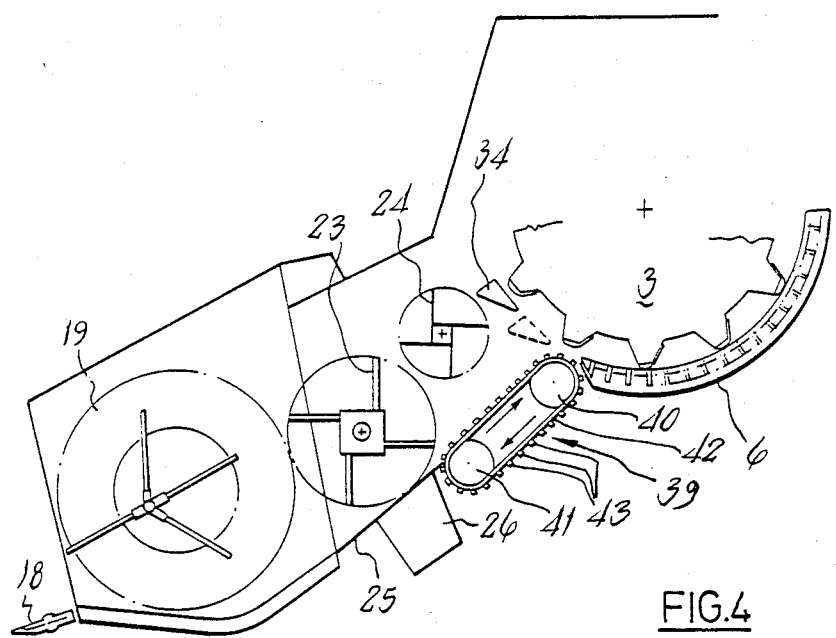
FIG. 4 is a side view of a second embodiment of a crop threshing mechanism according to the invention.

In the alternative embodiment illustrated in FIG. 4, the roller 27 is replaced by a continuous band-type conveyor 39 comprising a pair of rollers 40, 41 and a band 42 passing over them. The upper roller 40 assumes the same position as the previous roller 27 along the front edge of the concave 3 and the lower roller 41 is located so that the upper run of the band 42 forms a substantially continuous surface with the floor 25 of the elevator. The surface of the band 42 is provided with gripper bars 43 to grip the crop more firmly. A drive mechanism with a speed change facility is provided to drive the conveyor 39 as in the first embodiment.

An advantage of this continuous band-type conveyor 39 is that it can more readily provide an increased area for engagement with the crop over an increased length of time, thereby ensuring that it is fully effective in controlling the speed of the crop.

We claim:

1. A combine harvester of the type having a crop elevator that feeds crop upwards across a crop floor to a rotary threshing cylinder arranged transversely of the direction of advance of the combine in work and adjacent a threshing concave so as to thresh crop fed tangentially between the cylinder and concave characterized in that a driven crop conveyor (27) is provided along the front edge of the concave (6) between the concave (6) and the upper end of the elevator crop floor (25) so as to form a substantially continuous crop floor surface with said floor (25) and concave (6) over which the crop passes, and a changeable speed drive mechanism (28, 29, 30, 33) is provided to drive the crop conveyor (27) and allow its speed to be changed so as to control the speed of crop flow to the threshing cylinder (3).

2. A combine harvester as claimed in claim 1 in which the crop conveyor (27) comprises a roller.

3. A combine harvester as claimed in claim 1 in which the crop conveyor comprises a continuous band conveyor (39).

4. A combine harvester as claimed in claim 1 in which the conveyor (27) is formed with channels in its outer periphery that extend along its length from end to end.

5. A combine harvester as claimed in claim 1 in which the outer periphery of the conveyor (27) is resilient.

6. A combine harvester as claimed claim 1 in which the changeable speed drive mechanism comprises a drive connection (28) between the threshing cylinder (3) and the crop conveyor (27) that includes a drive ratio change mechanism (30, 33).

7. A combine harvester as claimed in claim 1 which includes crop guide means (34) that is located adjacent the conveyor (27) so that the crop passes between the guide means (34) and conveyor (27), the guide means (34) being adjustable relative to the conveyor (27) so as to vary the angle at which the crop is fed to the cylinder (3).

8. A combine harvester as claimed in claim 7 in which the crop guide means (34) comprises a flap that extends substantially parallel to the conveyor (27) and that extends into the crop path to deflect the crop.

9. A combine harvester as claimed in claim 8 in which the flap (34) is pivotally movable to vary the crop feed angle.

10. A combine harvester as claimed in claim 8 in which the flap (34) is bodily movable towards and away from the conveyor (27) to vary the crop feed angle.

* * * * *